July 19, 1927.
C. E. REED
EARTH BORING TOOL
Filed March 12, 1927
1,636,668
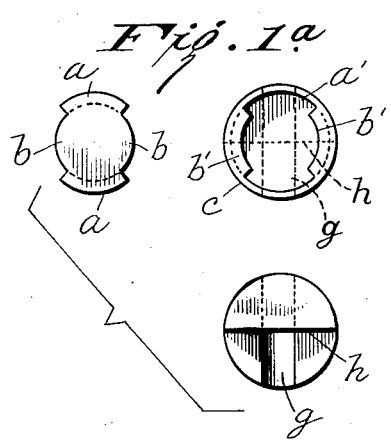
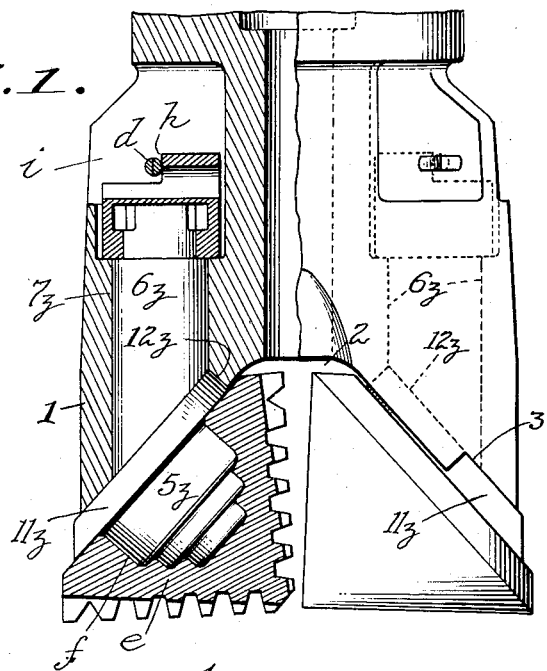
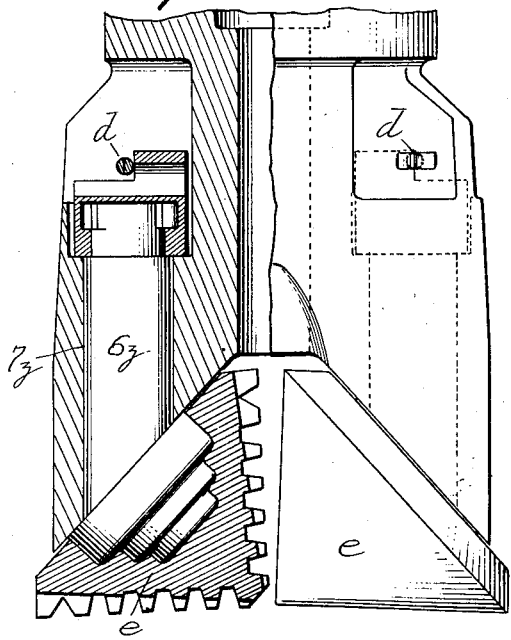
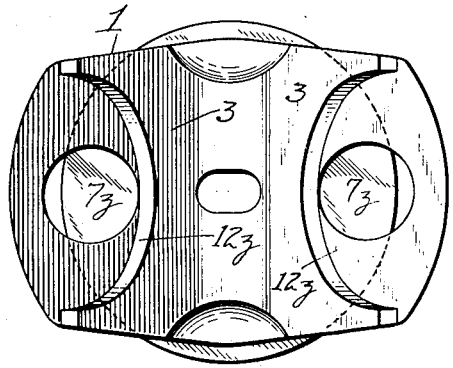
Inventor
CLARENCE E. REED,
By Spear, Middleton, Donaldson & Hall
Attorneys

Patented July 19, 1927.

1,636,668

UNITED STATES PATENT OFFICE.

CLARENCE E. REED, OF WICHITA, KANSAS.

EARTH-BORING TOOL.

Application filed March 12, 1927. Serial No. 174,824.

The invention relates to earth boring apparatus of the type in which a pair of juxtaposed rotary conical cutters cut the entire area at the bottom of the hole. The bit head of such a tool is provided with an inverted V-shaped recess at its lower end and the cutters are mounted on spindles whose axes are convergent downwardly and inwardly towards the vertical axis of the apparatus, said spindles projecting substantially at right angles to the downwardly and outwardly divergent walls defining said inverted V-shaped recess.

One object of the invention is to provide a construction rendering possible the use of a one piece head, on which the roller cutter organization is mounted to occupy the said inverted V-shaped recess.

Other objects of the invention will be referred to hereinafter.

In the accompanying drawings forming a part of this specification:

Figure 1 is a view of a bit head and roller cutter organization partly in vertical section and partly in elevation.

Fig. 1$^a$ shows details.

Fig. 2 is a bottom view of the bit head.

Fig. 3 shows another form of the invention.

1 indicates the bit head having an inverted V-shaped recess 2 at its lower end defined by the downwardly and outwardly diverging walls 3. This bit head is in one piece. The spindles 5$^z$ are formed integral with their shanks 6$^z$ and with their bases or flanges 11$^z$. These bases are designed to occupy seat recesses 12$^z$ in the ceiling of the inverted V-shaped recess. The shanks 6$^z$ are of cylindrical form as are also the spindles, and said shanks occupy sockets 7$^z$ within the main body of the head. At their upper ends the sockets 7$^z$ merge into recesses in the side of the bit head. Into these recesses the upper ends of the shanks project and any suitable retaining means may be placed here to hold the shanks in place within the heads. As one form of such means that may be used, I would mention that the upper end of the shank may be provided with flanges and gateways, $a$, $b$ and a collar $c$ having complementary gateways and flanges $a'$, $b'$ engages the said upper end of the shank and holds it in place. The collar can be held from turning back by any suitably locking key $d$.
The roller cutters $e$ are of conical form, each having a bore $f$ adapted to fit the spindle 5$^z$ when slipped thereupon. The cutters cover the ends of the spindles.

The sockets 7$^z$ extend substantially parallel with the vertical axis of the drill head. In assembling the cutter organization at least one cutter must be assembled with its spindle and shank to be handled as one body, or unit. The last cutter unit must be inserted into place in a manner so as not to be interferred with by the previously inserted cutter and owing to the fact that the cutters are juxtaposed to cut the entire area at the bottom of the hole and the pair of them occupy virtually all the space between the walls of the inverted V-shaped recess and indeed project slightly beyond said space, the last cutter unit inserted must not occupy during said insertion more than the limited field it is to finally occupy. That is to say, during said insertion the unit can not cross the vertical axis of the bit head, as otherwise its insertion would be obstructed by the presence of the other unit.

I therefore assemble the cutter on its spindle and integral shank and insert this unit by moving it substantially parallel but close to the vertical axis of the drill head, the cylindrical shank seating itself in socket 7$^z$ and the base flange 11$^z$ seating itself in the recess 12$^z$.

The spindle base conforms in inclination to the inclined side 3 of the inverted V-shaped recess and the axis of the shank 6$^z$ is at an inclination to the base 11$^z$. By reason of this angular relation of the parts, the unit will be held from turning in the head about the axis of the cylindrical shank and little or no provision need be made to hold the shank and spindle against turning movement in the head. The only duty imposed upon the holding collar is to retain the shank 6$^z$ against displacement in the downward direction of its axis.

Not only does the inclined relation of the shank to the spindle and its base contribute to the non-rotative effect just referred to, but it will be noted also that the base 11$^z$ finds a bearing against the flanges or walls defining the seat recess.

These flanges or walls take the upthrust of the cutter unit when the drill is working. I do not limit myself to their use as a means for holding the cutter organization against rotary displacement, i. e., about the axis of the cylindrical shank, because, as pointed out above, the inclined relation of the shank and spindle or shank and spindle base will take care of this.

The spindle and its base being integral with the shank can not have rotative displacement, as a one piece body can not rotate about two axes which are not coincident.

Therefore my structure lends itself in a simple manner to a rigid and rugged assembly.

As above stated, the roller cutters are simply slipped onto the spindles. Each will afford a stop for the other against dropping off of its spindle. They may drop into contact when the tool is not working or is being lowered into the well, but when the apparatus rests upon the bottom of the hole being bored, the said cutters will move back on their spindle under the weight of the head and drill pipe and will be in position to cut a hole of the desired gauge.

I do not limit myself, however, to a slip-on mounting for the roller cutter.

So far as the feature of the shank and spindle in its non-rotative relation to the head is concerned, by reason of the spindle emerging from the downwardly and outwardly inclined wall of the inverted V-shaped recess, it is to be understood that this feature is not confined to a spindle formed in one piece and a shank formed in one piece and the spindle and shank formed in one piece, as the same effect can be secured with a spindle and shank made of lengthwise halves, each half of the shank being integral with one lengthwise half of the spindle. In that case each spindle member is inclined in relation to its shank member.

The seat recess is formed on an arc with the axis of the spindle as a center.

In Fig. 3 I show the principle of the invention carried out in connection with a one piece spindle and shank having no base flange and with a bit head having no seat recess in its inclined wall. In this form of the invention the shank is at an inclination to the spindle. In this form, like in the form first described, the line of junction between the spindle portion and the shank portion lies in the plane of the inclined wall through which the socket for the shank emerges and in both cases the same effect is present in that the spindle and shank will be retained against tendency to rotate under the strains and stresses to which they are subjected because of the angular relation of the spindle and shank to each other and the different angular relation of the spindle and shank respectively to the outwardly and downwardly inclined wall of the V-shaped recess in the plane of which the spindle portion and the shank portion meet. This inclined wall in the form first described is the ceiling of the seat recess and in the last mentioned form it is the inclined wall having no recess, and it will be understood that where in the appended claims I refer to the inclined wall of the V shaped recess or the end wall of said recess, these terms are meant to apply either to the ceiling of the seat recess or to the end wall having no seat recess as in either case the wall referred to is in the plane where the spindle and shank join, whether said spindle has a base flange or not.

So far as this feature of the invention is concerned i. e. the holding of the shank and spindle against rotative displacement in the bit head because of the angular relation of these parts and the relation of their junction point to the inclined plane of the surface of the bit head, it will be understood that I do not limit myself to the one piece character of the shank and spindle for the same principle is involved in the form of spindle and shank disclosed in an application filed by me March 1, 1927. It will thus be understood that this feature of the invention is not limited either to the specific form of the spindle nor to the manner of mounting the cone cutter upon the spindle i. e. whether it is slipped on or held on by some suitable connection.

Reverting to the locking collar, it will be understood that the operation of applying this locking piece is to introduce it upon the upper end of the shank by a downward axial movement so that the flange on one member will pass through the complementary gate on the other member. The collar is then turned so that its flange or flanges will engage below the flange or flanges of the shank and then the collar is held against turning either forward or backward by a cotter pin or key $d$ which is passed through openings in the head so as to rest upon the shoulder $h$ of the collar, which being flat, will prevent rotation. The collar rests upon the bottom of the recess $i$ formed in the side of the bit head. In order to turn the collar, it is provided with an opening $g$ to receive a suitable implement.

In all forms of the invention the locking collar has no duty to perform other than holding the shank against dropping out of the head. It does not have to hold the shank against rotary movement.

For convenience of illustration the flanges on shank and collar are displaced a quarter in Figs. 1 and 3.

I claim as my invention:

1. In combination in an earth boring apparatus, a one piece head having an inverted V-shaped recess in its lower end, a removable spindle member projecting substantially at right angles to the downwardly and outwardly inclined wall defining said inverted V-shaped recess, a shank member integral with the spindle member and extending at an inclination to said spindle member, and seated within the head, the juncture between said spindle member and shank member being at the said inclined wall of the recess, a roller cutter mounted on the spindle and a second roller cutter mounted upon the other inclined wall of the recess, said cutters being juxtaposed on opposite sides of the vertical axis of the drill and cutting the entire area at the bottom of the hole, and means connecting the shank member to the head and resisting displacement of said shank axially, substantially as described.

2. A drill for boring wells in accordance with claim 1, in which a base surface is provided at the juncture of the shank portion and the spindle portion, said surface conforming in inclination to that of the end wall of the inverted V-shaped recess and bearing thereagainst, substantially as described.

3. An earth boring drill comprising a one piece head having an inverted V-shaped recess at its lower end, a removable spindle projecting relative to one of said inclined walls, a shank integral with the spindle member, and extending at an inclination to said spindle and seated within the head, means for holding said shank against axial displacement, a roller cutter slipped onto the spindle, an opposing roller cutter mounted on the other inclined wall of the inverted V-shaped recess, said roller cutters being juxtaposed on opposite sides of the vertical axis of the drill to cut the entire area at the bottom of the hole, the slipped-on cutter being held from dropping off its spindle by the opposing rotary cutter, said slipped-on roller cutter with its spindle and shank being inserted into the bit head as a unit through said inverted V-shaped recess, substantially as described.

4. In combination with a bit head of an earth boring tool, having a socket, a spindle for a rotary cutter having a shank seated in said socket, said shank having a flange and a gate-way at its upper end, a collar having a complementary flange and gateway, whereby upon applying said collar to the end of the shank and turning it, said flanges will engage to hold the shank in the socket, said collar then resting on the head, and means removably seated on a part of the head for holding the collar against turning movement when the flanges engage, substantially as described.

5. Locking means according to claim 4 having a shoulder and a member seated on the head and extending across said shoulder to prevent turning of said member, substantially as described.

6. Locking means according to claim 4 having a shoulder and a cotter pin seated in the head and bearing upon the said shoulder.

7. In combination in an earth boring apparatus, a bit head having its under face inclined in relation to the vertical axis of the drill, a roller cutter, a spindle member extending substantially at right angles from said inclined surface, said spindle member having a shank portion integral therewith and extending up into the bit head at an inclination to said inclined surface and to the axis of the spindle, and means for holding said shank removably within the bit head, said roller cutter covering the spindle and having its base located directly adjacent said inclined surface, and said spindle having its base larger than the shank and overlapping the inclined surface about the socket in which the shank lies, substantially as described.

8. An earth boring apparatus according to claim 7 having holding means for the shank comprising a collar which is rotative relative to the shank and is provided with a flange and gate complementary to a flange and a gate on the shank, and means for holding said collar against rotative movement when the flanges are set into engagement with each other, said means being seated in the head, substantially as described.

In testimony whereof, I affix my signature.

CLARENCE E. REED.